US010755747B2

(12) United States Patent
Bloch et al.

(10) Patent No.: US 10,755,747 B2
(45) Date of Patent: Aug. 25, 2020

(54) SYSTEMS AND METHODS FOR CREATING LINEAR VIDEO FROM BRANCHED VIDEO

(71) Applicant: JBF Interlude 2009 LTD, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 15/481,916

(22) Filed: Apr. 7, 2017

(65) Prior Publication Data
US 2017/0345460 A1    Nov. 30, 2017

Related U.S. Application Data

(63) Continuation of application No. 14/249,627, filed on Apr. 10, 2014, now Pat. No. 9,653,115.

(51) Int. Cl.
*G11B 27/034* (2006.01)
*H04N 21/8541* (2011.01)
(Continued)

(52) U.S. Cl.
CPC ....... *G11B 27/034* (2013.01); *H04N 21/8541* (2013.01); *A63F 13/47* (2014.09); *H04N 21/42646* (2013.01)

(58) Field of Classification Search
CPC .. A63F 13/47; A63F 13/10; A63F 2300/6018; A63F 13/63; A63F 3/048;
(Continued)

(56) References Cited

U.S. PATENT DOCUMENTS 4,569,026 A    2/1986  Best
5,137,277 A *  8/1992  Kitaue .................... A63F 13/02
                                                          463/2

(Continued)

FOREIGN PATENT DOCUMENTS

CA    2639491 A1    3/2010
DE    004038801 A1  6/1992
(Continued)

OTHER PUBLICATIONS

An ffmpeg and SDL Tutorial, "Tutorial 05: Synching Video," Retrieved from Internet on Mar. 15, 2013: <http://dranger.com/ffmpeg/tutorial05.html>, 4 pages.
(Continued)

*Primary Examiner* — David E Harvey
(74) *Attorney, Agent, or Firm* — Goodwin Procter LLP

(57) ABSTRACT

Computer-implemented methods and systems for creating non-interactive, linear video from video segments in a video tree. Selectably presentable video segments are stored in a memory, with each segment representing a predefined portion of one or more paths in a traversable video tree. A linear, non-interactive video is automatically created from the selectably presentable video segments by traversing at least a portion of a first path in the video tree and, upon completion, is provided to a viewer for playback.

20 Claims, 4 Drawing Sheets

(51) Int. Cl.
*A63F 13/47* (2014.01)
*H04N 21/426* (2011.01)

(58) Field of Classification Search
CPC ............... A63F 3/04; H04N 21/42646; H04N 21/21805; H04N 21/8541; G11B 27/034; G07F 17/323; G07F 17/3227
See application file for complete search history.

(56) References Cited

U.S. PATENT DOCUMENTS

| | | | |
|---|---|---|---|
| 5,161,034 A * | 11/1992 | Klappert | G11B 19/00 386/234 |
| 5,568,602 A * | 10/1996 | Callahan | A63F 13/10 715/203 |
| 5,568,603 A * | 10/1996 | Chen | G06F 3/04845 715/784 |
| 5,597,312 A | 1/1997 | Bloom et al. | |
| 5,607,356 A * | 3/1997 | Schwartz | A63F 13/10 463/31 |
| 5,610,653 A | 3/1997 | Abecassis | |
| 5,636,036 A | 6/1997 | Ashbey | |
| 5,676,551 A | 10/1997 | Knight et al. | |
| 5,715,169 A * | 2/1998 | Noguchi | A63F 13/10 360/132 |
| 5,734,862 A | 3/1998 | Kulas | |
| 5,737,527 A | 4/1998 | Shiels et al. | |
| 5,745,738 A * | 4/1998 | Ricard | G06F 9/45512 345/952 |
| 5,751,953 A * | 5/1998 | Shiels | A63F 13/10 715/720 |
| 5,754,770 A | 5/1998 | Shiels et al. | |
| 5,818,435 A | 10/1998 | Kozuka et al. | |
| 5,848,934 A * | 12/1998 | Shiels | A63F 13/10 463/9 |
| 5,887,110 A | 3/1999 | Sakamoto et al. | |
| 5,894,320 A | 4/1999 | Vancelette | |
| 5,956,037 A | 9/1999 | Osawa et al. | |
| 5,983,190 A * | 11/1999 | Trower, II | G06F 8/00 704/275 |
| 6,067,400 A * | 5/2000 | Saeki | G09B 5/065 386/243 |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 * | 4/2001 | Shiels | A63F 13/00 380/211 |
| 6,240,555 B1 | 5/2001 | Shoff et al. | |
| 6,298,020 B1 | 10/2001 | Kumagami | |
| 6,298,482 B1 | 10/2001 | Seidman et al. | |
| 6,460,036 B1 | 10/2002 | Herz | |
| 6,657,906 B2 | 12/2003 | Martin | |
| 6,698,020 B1 | 2/2004 | Zigmond et al. | |
| 6,728,477 B1 | 4/2004 | Watkins | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,472,910 B1 * | 1/2009 | Okada | B41J 3/4075 358/1.15 |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt et al. | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,612,517 B1 | 12/2013 | Yadid et al. | |
| 8,650,489 B1 | 2/2014 | Baum et al. | |
| 8,667,395 B2 * | 3/2014 | Hosogai | A63F 13/10 715/716 |
| 8,750,682 B1 | 6/2014 | Nicksay et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,367,196 B1 * | 6/2016 | Goldstein | G06F 3/048 |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,520,155 B2 | 12/2016 | Bloch et al. | |
| 9,530,454 B2 | 12/2016 | Bloch et al. | |
| 9,607,655 B2 | 3/2017 | Bloch et al. | |
| 9,641,898 B2 | 5/2017 | Bloch et al. | |
| 9,653,115 B2 * | 5/2017 | Bloch | G11B 27/034 |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,178,421 B2 | 1/2019 | Thomas et al. | |
| 10,523,982 B2 | 12/2019 | Oyman | |
| 2002/0019799 A1 * | 2/2002 | Ginsberg | G06Q 30/0601 705/37 |
| 2002/0053089 A1 | 5/2002 | Massey | |
| 2002/0086724 A1 * | 7/2002 | Miyaki | A63F 13/537 463/9 |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0174430 A1 | 11/2002 | Ellis et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0012409 A1 | 1/2003 | Overton et al. | |
| 2003/0076347 A1 | 4/2003 | Barrett et al. | |
| 2003/0148806 A1 * | 8/2003 | Weiss | G07F 17/32 463/20 |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0009813 A1 * | 1/2004 | Wind | A63F 13/10 463/30 |
| 2004/0019905 A1 | 1/2004 | Fellenstein et al. | |
| 2004/0034711 A1 | 2/2004 | Hughes | |
| 2004/0070595 A1 * | 4/2004 | Atlas | G06F 17/2241 715/723 |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2004/0199923 A1 | 10/2004 | Russek | |

(56) References Cited

U.S. PATENT DOCUMENTS

| | | |
|---|---|---|
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1* | 5/2005 | Sato .................. G07F 17/3211 463/30 |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1* | 3/2006 | Norton ................. G11B 19/025 725/135 |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0099684 A1 | 5/2007 | Butterworth |
| 2007/0101369 A1 | 5/2007 | Dolph et al. |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1* | 3/2010 | Yamada .................. A63F 13/10 463/43 |
| 2010/0077290 A1 | 3/2010 | Pueyo |
| 2010/0088726 A1 | 4/2010 | Curtis et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1* | 5/2011 | Ben Shaul ............... A63J 25/00 715/723 |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0191684 A1 | 8/2011 | Greenberg |
| 2011/0191801 A1 | 8/2011 | Vytheeswaran |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1* | 4/2012 | McCaddon ........ H04N 21/8545 463/42 |
| 2012/0110618 A1 | 5/2012 | Kilar et al. |
| 2012/0110620 A1 | 5/2012 | Kilar et al. |
| 2012/0120114 A1 | 5/2012 | You et al. |

(56) References Cited

U.S. PATENT DOCUMENTS

| | | |
|---|---|---|
| 2012/0134646 A1 | 5/2012 | Alexander |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0213495 A1 | 8/2012 | Hafeneger et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0028573 A1 | 1/2013 | Hoofien et al. |
| 2013/0031582 A1 | 1/2013 | Tinsman et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0335427 A1 | 12/2013 | Cheung et al. |
| 2014/0019865 A1 | 1/2014 | Shah |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0094313 A1 | 4/2014 | Watson et al. |
| 2014/0101550 A1 | 4/2014 | Zises |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1* | 7/2014 | Chimes ............... A63F 13/497 463/43 |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0046946 A1 | 2/2015 | Hassell et al. |
| 2015/0058342 A1 | 2/2015 | Kim et al. |
| 2015/0067723 A1 | 3/2015 | Bloch et al. |
| 2015/0104155 A1 | 4/2015 | Bloch et al. |
| 2015/0160853 A1 | 6/2015 | Hwang et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0258454 A1 | 9/2015 | King et al. |
| 2015/0293675 A1 | 10/2015 | Bloch et al. |
| 2015/0304698 A1 | 10/2015 | Redol |
| 2015/0331942 A1 | 11/2015 | Tan |
| 2016/0021412 A1 | 1/2016 | Zito, Jr. |
| 2016/0037217 A1 | 2/2016 | Harmon et al. |
| 2016/0062540 A1 | 3/2016 | Yang et al. |
| 2016/0066051 A1 | 3/2016 | Caidar et al. |
| 2016/0094875 A1 | 3/2016 | Peterson et al. |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0277779 A1 | 9/2016 | Zhang et al. |
| 2016/0303608 A1 | 10/2016 | Jossick |
| 2016/0322054 A1 | 11/2016 | Bloch et al. |
| 2016/0323608 A1 | 11/2016 | Bloch et al. |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0289220 A1 | 10/2017 | Bloch et al. |
| 2017/0295410 A1 | 10/2017 | Bloch et al. |
| 2017/0345460 A1 | 11/2017 | Bloch et al. |
| 2018/0007443 A1 | 1/2018 | Cannistraro et al. |
| 2018/0025078 A1 | 1/2018 | Quennesson |
| 2018/0068019 A1 | 3/2018 | Novikoff et al. |
| 2018/0130501 A1 | 5/2018 | Bloch et al. |
| 2018/0191574 A1 | 7/2018 | Vishnia et al. |
| 2018/0262798 A1 | 9/2018 | Ramachandra |
| 2019/0075367 A1 | 3/2019 | van Zessen et al. |

FOREIGN PATENT DOCUMENTS

| | | | |
|---|---|---|---|
| DE | 10053720 A1 | | 4/2002 |
| EP | 0965371 A2 | | 12/1999 |
| EP | 1033157 A2 | | 9/2000 |
| EP | 2104105 A1 | | 9/2009 |
| GB | 2359916 A | | 9/2001 |
| GB | 2428329 A | | 1/2007 |
| JP | 2003245471 A | * | 9/2003 |
| JP | 2008-005288 A | | 1/2008 |
| KR | 2004-0005068 A | | 1/2004 |
| KR | 2010-0037413 A | | 4/2010 |
| WO | WO-1996/013810 A1 | | 5/1996 |
| WO | WO-2000/059224 A1 | | 10/2000 |
| WO | WO-2007/062223 A2 | | 5/2007 |
| WO | WO-2007/138546 A2 | | 12/2007 |
| WO | WO-2008/001350 A2 | | 1/2008 |
| WO | WO-2008/052009 A2 | | 5/2008 |
| WO | WO-2008/057444 A2 | | 5/2008 |
| WO | WO-2009/137919 A1 | | 11/2009 |
| WO | WO-2009125404 A3 | | 1/2010 |

OTHER PUBLICATIONS

Archos Gen 5 English User Manual Version 3.0, Jul. 26, 2007, pp. 1-81.

Barlett M, (2008), "iTunes 11: How to Queue Next Song," Technipages, Oct. 6, 2008 issue, pp. 1-8, retrieved on Dec. 26, 2013 from the Internet: http://www.technipages.com/itunes-gueue-next-song.html.

International Search Report and Written Opinion for International Application PCT/IB2013/001000 dated Jul. 31, 2013, 12 pages.

International Search Report for International Patent Application PCT/IL2010/000362 dated Aug. 25, 2010, 2 pages.

(56) References Cited

OTHER PUBLICATIONS

International Search Report for International Patent Application PCT/IL2012/000080 dated Aug. 9, 2012, 4 pages.
International Search Report for International Patent Application PCT/IL2012/000081 dated Jun. 28, 2012, 4 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/oog-vorbis-encoder-for-flash-alchemy-series-part-1/, 2011, pp. 1-8.
Miller G et al., (2009) "MiniDiver: A Novel Mobile Media Playback Interface for Rich Video Content on an iPhoneTM," *Entertainment Computing A ICEC 2009*, pp. 98-109.
Sodagar I, (2011) "The MPEG-DASH Standard for Multimedia Streaming Over the Internet", *IEEE Multimedia*, IEEE Service Center, New York, NY, US, 18(4):62-7.
Supplemental European Search Report for EP10774637.2 (PCT/IL2010/000362) dated Jun. 20, 2012, 6 pages.
Supplemental European Search Report for EP13184145 dated Jan. 30, 2014, 6 pages.
Yang H et al., (2010) "Time Stamp Synchronization in Video Systems," Teletronics Technology Corporation, <http://www.ttcdas.com/products/dausencoders/pdf/techpapers/tp2010timestampvideosystem.pdf.>, Abstract, 8 pages.
U.S. Appl. No. 13/921,536 Published as US2014/0380167, Systems and Methods for Multiple Device Interaction with Selectably Presentable Media Streams, filed Jun. 19, 2013.
U.S. Appl. No. 15/395,477, System and Methods for Dynamic Weighting of Branched Video Paths, filed Dec. 30, 2016.
U.S. Appl. No. 14/884,285 Published as US2017/0178601, Systems and Method for Assembling a Recorded Composition, filed Oct. 15, 2015.
U.S. Appl. No. 14/639,579 U.S. Pat. No. 10,474,334 Published as US2015/0199116, Progress Bar for Branched Videos, filed Mar. 5, 2015.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/534,626 Published as US-2018-0130501-A1, Systems and Methods for Dynamic Video Bookmarking, filed Sep. 13, 2017.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193, Systems and Methods for Nonlinear Video Playback Using Linear Real-Time Video Players, filed Jan. 24, 2020.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082 Published as US2019/0392868, Systems and Methods for Adaptive and Responsive Video, filed Sep. 3, 2019.
U.S. Appl. No. 15/085,209 U.S. Pat No. 10,462,202 Published as US2017/0289220, Media Stream Rate Synchronization, filed Mar. 30, 2016.
U.S. Appl. No. 15/189,931 U.S. Pat. 10,2018,790 Published as US2017/0374120, Dynamic Summary Generation for Real-time Switchable Video, filed Jun. 22, 2016.
U.S. Appl. No. 15/863,191 U.S. Pat. No. 10,257,578, Dynamic Library Display for Interactive Videos, filed Jan. 5, 2018.
U.S. Appl. No. 16/283,066, Dynamic Library Display for Interactive Videos, filed Feb. 22, 2019.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, System and Methods for Detecting Anomalous Activities for Interactive Videos, filed Feb. 18, 2020.
U.S. Appl. No. 12/706,721 U.S. Pat. 9,190,110 Published as US2010/0293455, System and Method for Assembling a Recorded Composition, filed Feb. 17, 2010.
U.S. Appl. No. 14/139,996 U.S. Pat. 9,641,898 Published as US2015/0181301, Methods and Systems for In-Video Library, filed Dec. 24, 2013.
U.S. Appl. No. 15/481,916 U.S. Pat. No. 9,653,155 Published as US2015/0294685, Systems and Methods for Creating Linear Video from Branched Video, filed Apr. 10, 2014.
U.S. Appl. No. 14/249,665 Published as US2015/0293675, Dynamic Timeline for Branched Video, filed Apr. 10, 2014.
U.S. Appl. No. 14/509,700 Published as US2016/0104513, Systems and Methods for Dynamic Video Bookmarking, filed Oct. 8, 2014.
U.S. Appl. No. 15/703,462, Systems and Methods for Dynamic Video Bookmarking, filed Oct. 13, 2017.
U.S. Appl. No. 15/085,209, Media Stream Rate Synchronization, filed Mar. 30, 2016.
U.S. Appl. No. 15/165,373, Symbiotic Interactive Video, filed May 26, 2016.
U.S. Appl. No. 15/189,931, Dynamic Summary Generation for Real-time Switchable videos, filed Jun. 22, 2016.
U.S. Appl. No. 15/395,477, Systems and Methods for Dynamic Weighting of Branched Video Paths, filed Dec. 30, 2016.
U.S. Appl. No. 15/997,284, Interactive Video Dynamic Adaptation and User Profiling, filed Jun. 4, 2018.
U.S. Appl. No. 15/863,191, Dynamic Library Display for Interactive Videos, filed Jan. 5, 2018.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 14/884,285 Published as US2016/0170948, System and Method for Assembling a Recorded Composition, filed Oct. 15, 2015.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 Published as US2016-0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 15/356,913, Systems and Methods for Real-Time Pixel Switching, filed Nov. 21, 2016.
U.S. Appl. No. 14/139,996 U.S. Pat. No. 9,641,898 Published as US2015/0181301, Methods and Systems for In-Video Library, filed Dec. 24, 2013.

(56) References Cited

OTHER PUBLICATIONS

U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015/0294685, Systems and Methods for Creating Linear Video From Branched Video, filed Apr. 10, 2014.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 Published as US2016/0105724, Systems and Methods for Parallel Track Transitions, filed Nov. 6, 2014.
U.S. Appl. No. 14/700,845 Published as US2016/0323608, Systems and Methods for Nonlinear Video Playback Using Linear Real-Time Video Players, filed Apr. 30, 2015.
U.S. Appl. No. 14/700,862, U.S. Pat. No. 9,672,868 Published as US2016/0322054, Systems and Methods for Seamless Media Creation, filed Apr. 30, 2015.
U.S. Appl. No. 14/835,857 Published as US2017/0062012, Systems and Methods for Adaptive and Responsive Video, filed Aug. 26, 2015.
U.S. Appl. No. 14/978,464 Published as US2017/0178601, Intelligent Buffering of Large-Scale Video, filed Dec. 22, 2015.
U.S. Appl. No. 14/978,491 Published as US2017/0178409, Seamless Transitions in Large-Scale Video, filed Dec. 22, 2015.
U.S. Appl. No. 15/085,209 Published as US-2017/0289220, Media Stream Rate Synchronization, filed Mar. 30, 2016.
U.S. Appl. No. 15/165,373 Published as US-2017/0295410, Symbiotic Interactive Video, filed May 26, 2016.
U.S. Appl. No. 15/189,931 Published as US 2017-0374120, Dynamic Summary Generation for Real-time Switchable Video, filed Jun. 22, 2016.
U.S. Appl. No. 15/395,477 Published as US 2018-0191574, Systems and Methods for Dynamic Weighting of Branched Video Paths, filed Dec. 30, 2016.
U.S. Appl. No. 15/997,284, Interactive Video Dynamic Adaption and User Profiling, filed Jun. 4, 2018.
U.S. Appl. No. 15/863,191, Dynamic Library Display for Interactive Videos, filed Mar. 5, 2018.

\* cited by examiner

SYSTEMS AND METHODS FOR CREATING LINEAR VIDEO FROM BRANCHED VIDEO

CROSS-REFERENCE TO RELATED APPLICATION

This application is a continuation of and claims priority to U.S. patent application Ser. No. 14/249,627, filed on Apr. 10, 2014, and entitled "Systems and Methods for Creating Linear Video from Branched Video," the entirety of which is incorporated by reference herein.

FIELD OF THE INVENTION

The present disclosure relates generally to video playback and editing and, more particularly, to systems and methods for automatically creating a passive linear video from an interactive branching video.

BACKGROUND

Over the past decade there has been an exponential growth in the prevalence of streaming media in the lives of the general public. Users frequently listen to streaming music on Internet radio stations such as Pandora, and watch streaming television shows, movies, and video clips on websites such as Hulu, Netflix, and YouTube. Interactive streaming multimedia content, though less common, is also available. Existing forms of interactive videos allow a viewer to make choices on how to proceed through pre-defined video paths; however, this functionality is accomplished using separate video segments that are jumped to upon selection, resulting in a noticeable disconnect in audio and video between consecutive segments. Further, some interactive videos require custom players or other software not readily available to certain viewers. Without access to such software, these viewers are unable to experience any portion of the interactive media.

SUMMARY

Systems and methods are presented for creating a linear, non-interactive video from a branching, interactive video such that viewers without the ability to view the interactive video can experience at least a portion of the interactive video in a linear, non-interactive manner. In one aspect, a computer-implemented method for constructing a linear video is provided. Selectably presentable video segments, each representing a predefined portion of one or more paths in a traversable video tree, are stored. A portion (or more) of a first path in the video tree is traversed to automatically create a linear, non-interactive video from those video segments in the path. Upon completion, the linear video is provided to a viewer for playback.

In one implementation, the linear, non-interactive video includes a teaser portion of at least some of the video segments from one of the paths of the video tree and/or includes all of the video segments from one of the paths of the video tree. The path that is traversed in the video tree can be selected based on attributes associated with a viewer of the linear video or another video, such as demographic attributes, geographic attributes, and/or social networking attributes. Alternatively, the traversed path can be randomly selected.

In another implementation, the first path is traversed by virtually playing back the portion of the first path and recording the playback as the linear, non-interactive video. In addition, a graphical user interface layer can be recorded as part of the linear, non-interactive video.

In some implementations, the linear, non-interactive video is automatically created by further traversing a portion (or all) of an alternative path branching from the first path, resulting in a linear, non-interactive video that includes video from the traversed portions of the first path and the alternative path. The linear video can include a split-screen configuration, in which video from the first path and video from the alternative path are simultaneously presented in separate video frame regions.

In another aspect, a system for constructing a linear video includes one or more computers programmed to perform various operations. Selectably presentable video segments, each representing a predefined portion of one or more paths in a traversable video tree, are stored. A portion (or more) of a first path in the video tree is traversed to automatically create a linear, non-interactive video from those video segments in the path. Upon completion, the linear video is provided to a viewer for playback.

In one implementation, the linear, non-interactive video includes a teaser portion of at least some of the video segments from one of the paths of the video tree and/or includes all of the video segments from one of the paths of the video tree. The path that is traversed in the video tree can be selected based on attributes associated with a viewer of the linear video or another video, such as demographic attributes, geographic attributes, and/or social networking attributes. Alternatively, the traversed path can be randomly selected.

In another implementation, the first path is traversed by virtually playing back the portion of the first path and recording the playback as the linear, non-interactive video. In addition, a graphical user interface layer can be recorded as part of the linear, non-interactive video.

In some implementations, the linear, non-interactive video is automatically created by further traversing a portion (or all) of an alternative path branching from the first path, resulting in a linear, non-interactive video that includes video from the traversed portions of the first path and the alternative path. The linear video can include a split-screen configuration, in which video from the first path and video from the alternative path are simultaneously presented in separate video frame regions.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
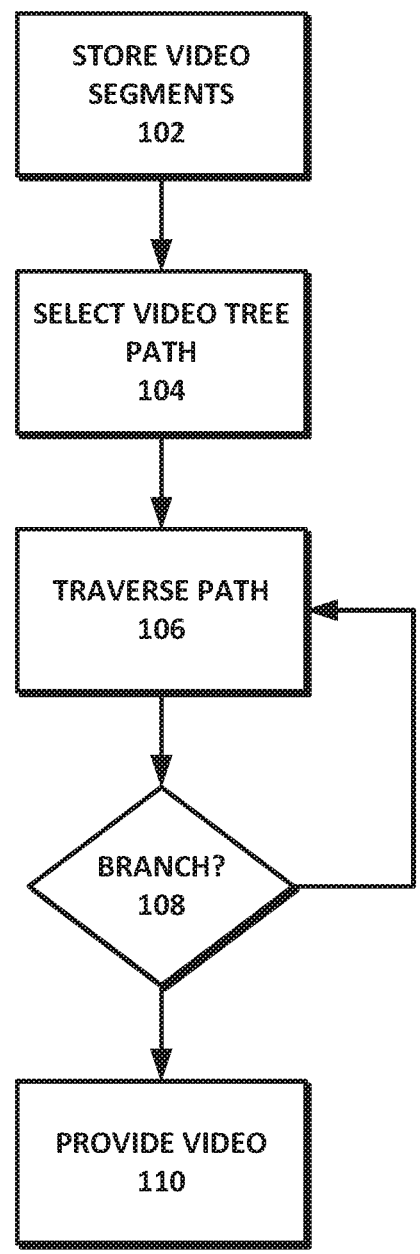
FIG. 1 is a flow diagram of a method for creating a non-interactive, linear video according to an implementation.

Described herein are various implementations of methods and supporting systems for transforming branching video into linear, non-interactive video. Referring to FIG. 1, a plurality of video segments are stored on a storage medium that can be on, e.g., a remote server, a computing device, a mobile device, and/or other system having storage capability (STEP 102), and are made available for retrieval by a processing device that can form linear and non-linear videos from the segments. In some implementations, the stored video segments are branching video segments that are connected in the form of a video tree. Users (e.g., viewers) can watch a video that begins from a starting segment in the tree and proceeds along adjacent video segments. Upon reaching a point where multiple video segments branch off from a currently viewed segment, the user can interactively select the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," the entirety of which is incorporated by reference herein.

The prerecorded video segments in a video tree can be selectably presentable multimedia content and can include, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and there can be multiple paths that a user can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the multimedia content along a content path can be performed by selecting among options that appear on and/or around the video while the video is playing. In some implementations, these options are presented to users at a decision point and/or during a decision period in a content segment. The display can hover and then disappear when the decision period ends or when an option has been selected. Further, a countdown or other visual, aural, or other sensory indicator can be presented during playback of content segment to inform the user of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

In some instances, a custom video player (e.g., a Flash-based player, browser plug-in, standalone application, etc.) is required to play selectably presentable, seamless media such as that described above. For users that do not readily have access to the custom video player, a passive (i.e., non-interactive) linear video can be created from the interactive video tree to allow for playback on a standard video player. The linear video can be created at the time the interactive video is created (e.g., after the editor has published the interactive video), dynamically upon the need to playback the linear video (e.g., when a user desires to watch an interactive video but does not have the necessary software installed), and/or upon publishing to interactive video to a non-interactive environment (e.g., YouTube, television, etc.). The linear video can be automatically created on any of these events and/or created entirely manually or with manual input (e.g., by the creator of the interactive video).

Figure 2A:
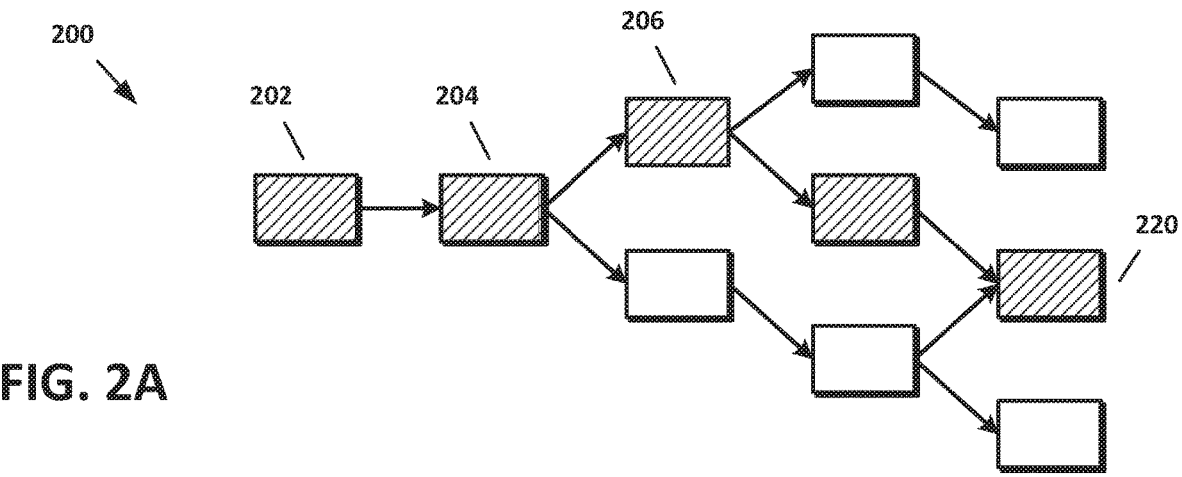
FIGS. 2A-2C are video tree diagrams illustrating various path traversals for a non-interactive, linear video.
Figure 2B:
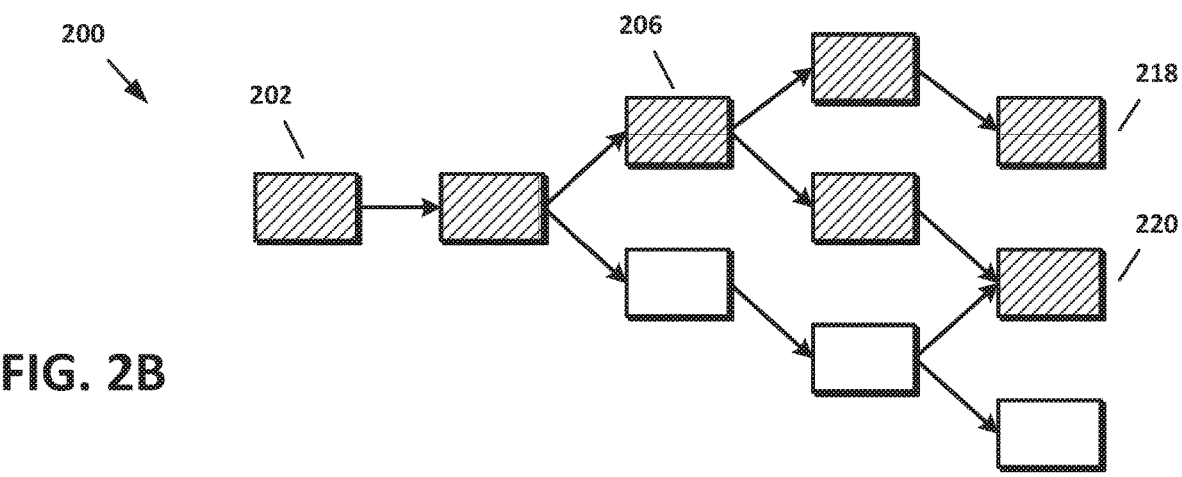
Figure 2C:
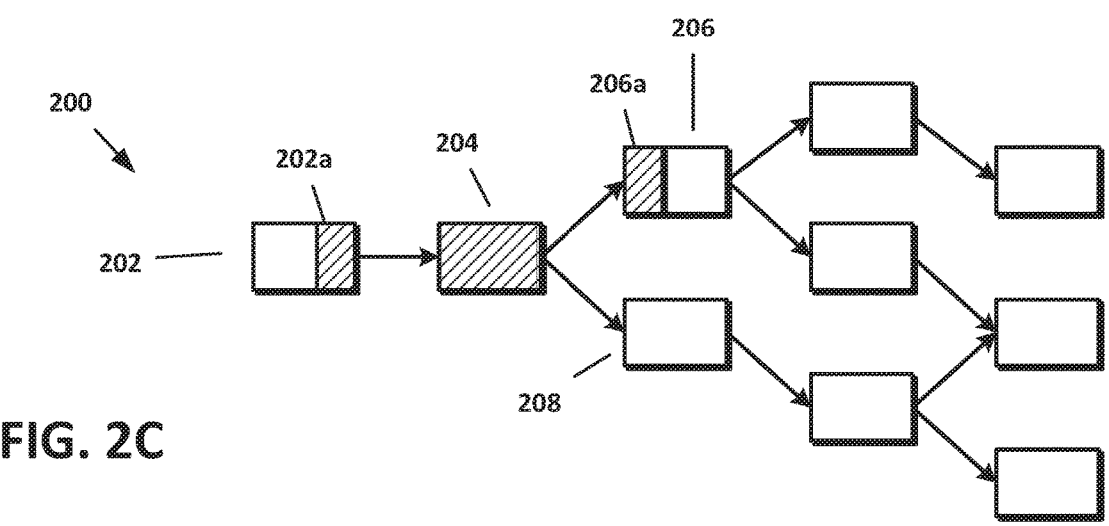

Proceeding to STEP 104, creation of the linear, non-interactive video includes selecting the video tree path or paths to traverse. Some or all of the video segments in the path can then be combined to form the linear video. Referring now to FIGS. 2A-2C, various paths (shaded blocks) are possible on an example video tree 200. In FIG. 2A, a full path is selected, starting at video segment 202 and ending at video segment 220. In the case of an interactive video using the same video tree 200, the path shown could be reproduced by an interacting user making the appropriate choices at branching segments (here, video segments 204 and 206) to traverse the shaded path and end at video segment 220. In some implementations, the full path from beginning to end need not be selected for traversal in creating the linear video; rather, a portion of the path can be selected (e.g., starting at video segment 204 and ending at video segment 206). In further implementations, video segments in a path can be skipped in creating the linear video (e.g., traversing the shaded path in FIG. 2A, but not including video segments 204 and 206 in the linear video).

As shown in FIG. 2B, multiple paths can be selected for traversal. In this case, the same path shown in FIG. 2A is selected, as is a path starting at video segment 202 and ending instead at video segment 218 (i.e., an alternate branch is traversed following video segment 206). In the linear video, the alternate branches can be presented serially (e.g., showing the video segments from one branch, then the video segments from another branch), and/or in parallel (e.g., showing video segments from multiple branches on screen at the same), as further described below.

In some implementations, portions of the video segments in a path can be included in the linear video, rather using the full video segments. For example, a "teaser" video can be created that showcases a sneak peek of the interactive experience. FIG. 2C shows a linear teaser video built from the video tree 200 in which the end portion 202a of video segment 202, all of video segment 204 leading up to a decision point at the end of the segment 204, and the beginning portion 206a of video segment 206 are combined to create the teaser. The selection of various combinations of video segments, video segment portions, paths, and/or path portions to create a linear video are contemplated.

The linear video can be the same for all users or can be customized for a specific user. In other words, the path(s) and video segment(s) (and/or portions thereof) selected from the video tree to create the linear video can be constant or variable. In some implementations, the paths and/or segments (or portions thereof) selected can be completely random. In other implementations, the paths and/or segments (or portions thereof) from the video tree can be selected from a predefined group of paths/segments. In further implementations, the paths and/or segments (or portions thereof) can be selected based on a set of rules defining valid paths that can be followed. In one implementation, the paths and/or segments (or portions thereof) can be automatically selected based on information associated with the viewer, such as demographic attributes (e.g., age, sex, income range), geographic attributes (e.g., country, region, time zone), and/or social networking attributes (e.g., videos shared by social connections). For example, a male viewer in the U.S. can be shown a different linear video than a female viewer in China. The paths and/or segments (or portions thereof) can also be automatically selected based on information associated with the interactive version of the linear video, such as popular selections made by other users when viewing the interactive version.

Referring again to FIG. 1, once a video path or paths has been selected (or will be dynamically selected during traversal of the video tree), the linear, non-interactive video is created by traversing the appropriate path(s) and associated video segment(s) (and/or portions thereof) (STEP 106). If more than one branch of a path is to be traversed (STEP 108), the process returns to STEP 106 to traverse each additional branch until the linear video is complete, at which point it can be provided to a user for playback (STEP 110). As described above, the interactive version of the video can include seamless connections between video segments such that there are no noticeable gaps, delays, or jarring transitions. Likewise, the linear, non-interactive video created from the interactive video tree can include the same seamless transitions so that some or all of the linear video plays as a continuous video presentation with consistently synchronized audio and video among individual segments.

As noted above, the linear video can include multiple paths shown in parallel by, e.g., splitting the video display area into multiple portions. The linear video can simultaneously display all or a subset of the video segment options for branches of a path. When creating the linear video, an editor can manually select which path options to display in parallel and/or how the video display area is divided into regions.

The display area regions can be polygonal shapes, elliptical shapes, or other suitable shapes arranged in any suitable manner. In some implementations, the regions are automatically defined based on the paths selected (whether manually or automatically).

Figure 3:
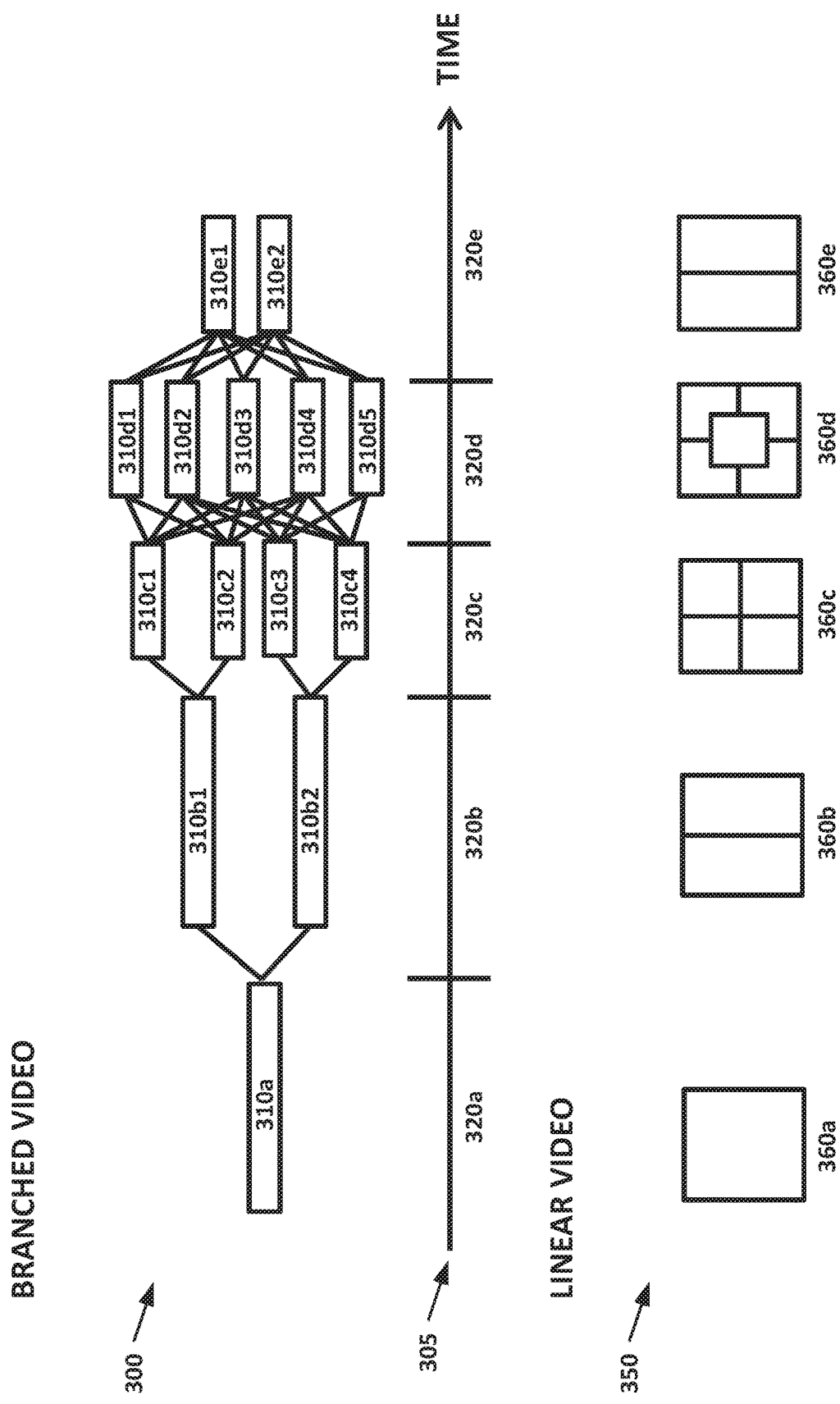
FIG. 3 is a diagram illustrating an example split-screen linear video created from a video tree.

In one example, shown in FIG. 3, a branched video tree 300 includes a timeline 305 that is divided into five sections 320a-320e. During playback of an interactive video corresponding to the tree 300, a video segment can be played in each of sections 320b-320e that corresponds to a selection made by a user (or an automatic selection). FIG. 3 further illustrates an example linear video 350 created from the video tree 300, in which all video segment options for each corresponding timeline section are simultaneously displayed. In section 320a, there is only one video segment 310a shown to all viewers, and so the display area of the linear video 350 includes a single full-screen region 360a. Upon reaching section 320b of the timeline 305, the linear video 350 splits into two regions 360b to simultaneously display corresponding video segments 310b1 and 310b2. The two regions 360b are shown as vertically separated, but other region configurations (e.g., horizontal, diagonal, picture-in-picture) are contemplated. Likewise, split-screen regions 360c allow for the simultaneous display of the four video segment options 310c1-310c4 corresponding to timeline section 320c, split-screen regions 360d allow for the simultaneous display of the five video segment options 310d1-310d5 corresponding to timeline section 320d, and split-screen regions 360e allow for the simultaneous display of the two video segment options 310e1 and 310e2 corresponding to timeline section 320e.

As described above, the interactive version of the video can include graphical and textual user interface elements, such as selection buttons, countdown timers, and other control and display elements. These interface elements can be reproduced in the linear, non-interactive video. For example, if, at a decision point in the interactive version of the video, an animated clock and selectable video thumbnail controls are shown, which allow a user to select a next video segment to watch, the same clock and thumbnails can be reproduced in the linear version of the video, but in a prerecorded, non-interactive manner. Further, in the linear video, a mouse cursor can be shown clicking one of the thumbnail controls in order to simulate user interaction.

Additional features can be added to the non-interactive, linear video. For example, the linear video can include an overlay or a separate portion of the display that shows a graphical representation of the full video tree and/or the path that is being shown. The path can be graphically updated as the user linearly moves from video segment to video segment. In some implementations, additional video can be added to the linear video that is not otherwise included in the interactive version (e.g., a general explanation on how to install the custom video player, introduction video, closing video, and so on). Likewise, additional audio can be included in the linear video (e.g., narration, soundtrack, etc.).

In further implementations, additional graphical and/or textual elements can be added to the linear video, such as logos, highlights, advertisements, pop-up bubbles, and arrows (e.g., to point out notable features that would be present in the interactive version of the video). Cursor/pointer movement can be included in the linear video to simulate the movement of a mouse, touchpad, or other input device that would be controlled by a user viewing the interactive version of the video. Features of the interactive video player can also be shown, such as looping, linking out to an external site, and a dynamic progress bar, such as that described in U.S. patent application Ser. No. 13/622,795, filed on Sep. 19, 2012, and entitled, "Progress Bar for Branched Videos," the entirety of which is incorporated by reference herein. The linear video can also show a "back-in-time" feature of the interactive video version, in which a selection of a next video segment is made at a decision point, the selected video segment is shown, and then the video is rewound, a different selection is made, and the corresponding video segment is played.

In one implementation, to create the linear video, the interactive version of the video is virtually played and recorded frame by frame. In some instances, this is accomplished by installing the custom interactive video player (e.g., browser and a plugin, standalone application, etc.) on a server and playing the interactive video according to the selected path(s) and/or video segment(s) (or portions thereof). In other instances, the video player is emulated to output the desired linear video. In the case where a linear video is created from multiple paths (e.g., serially or in parallel as a split screen, as shown in FIG. 3), the linear video can be created by playing one path in part or in full, then returning to each branching point (or the beginning of the video) and playing each other path. The video segments in the paths are then combined together automatically and/or as defined by an editor or other user to produce the linear video.

The linear video can be recorded alone and/or in conjunction with a graphical user interface layer (e.g., to reproduce interface elements as described above). One example method for recording the linear video and the user interface includes the steps of running the interactive video on the custom player; controlling the video by automatically selecting video segment options at decision points and/or manipulating the player controls (e.g., stop, play, rewind, pause, etc.); and recording the resulting video frames. The interactive video can be automatically controlled in a randomized fashion or according to a script or other rule set. As the interactive video is played, all or a subset of frames are recorded as the linear video, which can include any associated video, audio, and/or interface elements. Optionally, additional content can be added to the linear video, as described above, such as narration and opening/closing audio and/or video segments.

In some implementations, the graphical user interface is recorded alone on a transparent video layer. One example method for recording the user interface alone includes the steps of building the linear, non-interactive video and accompanying audio from selected path(s) and/or video segment(s), but without user interface components; reproducing the user interface elements over a transparent video using the custom player; recording the frames that include the user interface elements; and merging (e.g., overlaying) the recorded user interface frames with the corresponding linear video frames. Optionally, additional content can be added to the linear video, as described above, such as narration and opening/closing audio and/or video segments. The video and audio components of the linear video can then be merged together to produce the complete linear video.

Figure 4:
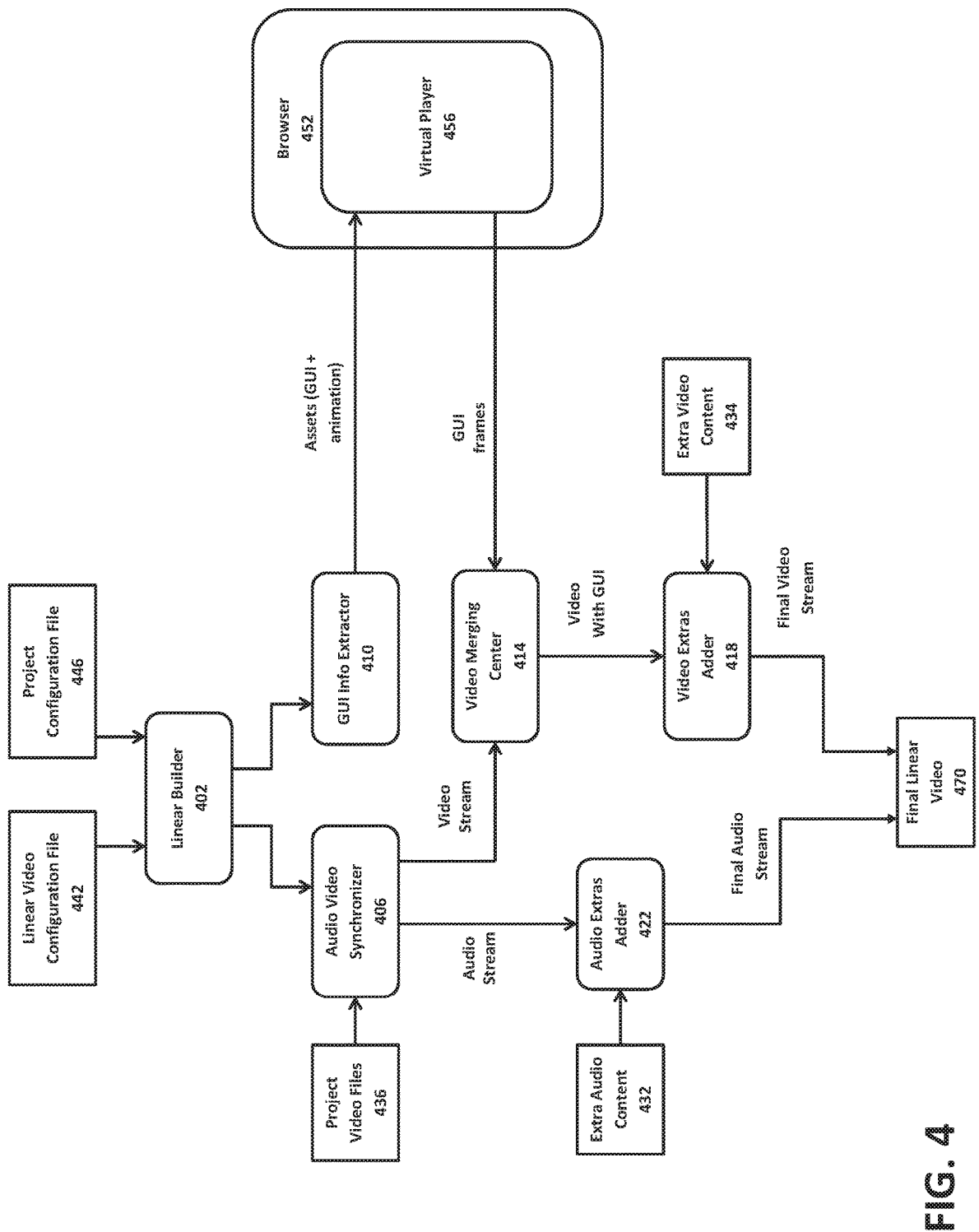
FIG. 4 is a block diagram of an example system for creating a non-interactive, linear video according to an implementation.

An example system for transforming an interactive video project to non-interactive, linear video using, e.g., the techniques described herein, is shown in FIG. 4. Interactive video projects can be similar to those described in U.S. patent application Ser. No. 13/622,780, filed on Sep. 19, 2012, and entitled "Systems and Methods for Constructing Multimedia Content Modules," and U.S. patent application Ser. No. 14/107,600, filed on Dec. 16, 2013, and entitled "Methods and Systems for Unfolding Video Pre-Roll," the entireties of which are hereby incorporated by reference.

In the present system, a Linear Builder component 402 receives as input a Linear Video Configuration File 442 and a Project Configuration File 446 and, based thereon, determines which portions of an interactive video project will be included in the final linear video 470. The Project Configuration File 446 can be a configuration file used in an interactive video project, and can include the interactive video tree structure and links to video, audio, and user interface elements. Specifically, the Project Configuration File 446 can specify which audio, video, and/or other media files correspond to each segment in the video tree, and which interface elements should be displayed or otherwise presented to users, as well as when the elements should be displayed, such that the audio, video, and interactive elements of the video are synchronized. The Linear Video Configuration File 442 defines the linear video composition description, and can include the length of the linear video, start point, end point, portions of segments to be played, user interface elements to be included, selections to be made on branching segments, and new video and audio assets, if any. For interactive videos that include real-time switching (e.g., where the video changes immediately upon user interaction), such as that described in U.S. Provisional Patent Application No. 61/889,304, filed on Oct. 10, 2013, and entitled "Systems and Methods for Real-Time Pixel Switching," the entirety of which is incorporated by reference herein, the Linear Video Configuration File 442 can also include the timing of the switches or any other details that assist the system in determining how to transition between the video changes (e.g., transition every 3 seconds, transition 4 times in 20 seconds, and so on).

The GUI Info Extractor component 410 parses the configuration files 442, 446 and extracts information relating to the user interface assets (e.g., asset identifiers, positioning, timing, etc.). The user interface assets are reproduced in a virtual interactive media player 456 in running in a web browser 452. The user interface assets can be reproduced on a transparent video layer, as described above, and returned as GUI frames to the Video Merging Center 414. The Audio Video Synchronizer 406 demultiplexes the project media assets (e.g., Project Video Files 436) into separate video and audio streams. The audio stream can then be processed by the Audio Extras Adder component 422, which merges Extra Audio Content 432, if any, into the audio stream. The video stream is processed by Video Merging Center 414, which merges graphical user interface elements, animations, and other interface overlays in the GUI frames into the video stream. The video stream can be further processed by the Video Extras Adder component 418, which merges Extra Video Content 434, if any, into the video stream. The audio and video streams are then multiplexed to produce the final linear video 470.

One example of automatic linear video creation using the present system is as follows, in which a teaser video is created from video tree 200 as shown in FIGS. 2A-2C. Specifically, a linear video is created from the last ten seconds of video segment 204 and the first ten seconds of video segment 206. Further, in this example, a closer video is added at the end of the linear teaser video. The video further includes user interface elements, cursor movements, and narration that commences during the portion of video segment 206.

Initially, Linear Builder 402 processes Project Configuration File 446 to determine a starting video segment in the video tree 200 (here, video segment 202). Then, starting from the initial video segment 202, the video tree 200 is traversed until a branching point is found (here, at the end of video segment 204). Branching video segment 204 can include user interface elements (e.g., video thumbnails or dialogs that allow the user to make a choice on which path to take). Information relating to these elements is collected by GUI Info Extractor 410, and the elements are reproduced and recorded using the virtual interactive media player 456. The individual frames of the user interface elements are recorded as the elements change over time (e.g., the appearance of a button, the selection of a button, etc.). The interface element frames are then combined with the corresponding video segments by Video Merging Center 414, and the audio for the segments is multiplexed with the video. The audio can be faded in and/or faded out, and the narration is added by Audio Extras Adder 422. The closing video segment is then added by Video Extras Adder 418. At this point the linear teaser video is complete.

Expanding on the above example, the teaser video can be constructed so that it includes simultaneously shown portions of video segments 206 and 208, rather than just video segment 206. In other words, upon reaching the branching point after video segment 204, the portions of video segments 206 and 208 can be shown in a split screen similar to that shown in FIG. 3. The video tree 200 can be traversed in various ways in compiling the linear video. For example, the path including video segments 202, 204, and 206 can be played first, then the path including video segments 202, 204, and 208 can be played. Alternatively, only video segment 208 can be played for the second path. In either instance, the portions of video segments 206 and 208 can be combined as a split-view of individual video frames. It is to be appreciated that there are various manners of traversing video trees to create linear videos that include multiple paths.

The linear video creation processes described herein can be implemented in any appropriate hardware or software. If implemented as software, the processes can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software downloaded to or existing on a user's device. Some of the functionality can exist remotely; for example, video creation functions can be performed on one or more remote servers. In some implementations, the user's device serves only to provide output and input functionality, with the remainder of the processes being performed remotely.

The local and/or remote software can be implemented on devices such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of a suitable programming languages, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
   receiving a plurality of video segments forming at least a portion of a traversable video tree, the video tree comprising a plurality of paths, each path comprising one or more of the video segments;
   automatically creating, at a first time, a linear, non-interactive video from the video segments by recording, on a server, a first virtual or emulated playthrough of the video tree, the creating of the linear, non-interactive video comprising:
   traversing, without manual user input, at least a portion of a first path in the video tree, the first path comprising a branching point at which the first path branches into a plurality of different paths in the video tree, wherein traversing at least the portion of the first path comprises selecting, without manual user input, which video segments in the first path to include, at least in part, in the linear, non-interactive video;
   adding to the linear, non-interactive video a graphical representation of simulated user interaction with a video segment from the traversed portion of the first path in the video tree, the simulated user interaction corresponding to a selection of one of the different paths in the video tree;
   traversing, without manual user input, at least a portion of the selected different path in the video tree, wherein traversing at least the portion of the selected different path comprises selecting, without manual user input, which video segments in the selected different path to include, at least in part, in the linear, non-interactive video; and
   combining (i) at least a portion of each of one or more video segments from the traversed portion of the first path in the video tree and (ii) at least a portion of each of one or more video segments from the traversed portion of the selected different path in the video tree, to form at least a portion of the linear, non-interactive video; and
automatically creating, at a second, later time, another linear, non-interactive video from the video segments by recording, on a server, a second virtual or emulated playthrough of the video tree, the creating of the another linear, non-interactive video comprising traversing, without manual user input, at least a portion of one or more paths in the video tree and combining at least a portion of each of a subplurality of video segments in the plurality of video segments, wherein automatically creating the other linear, non-interactive video at the second time results in the other linear, non-interactive video containing video content different from video content in the linear, non-interactive video created at the first time.

2. The method of claim 1, further comprising providing the linear, non-interactive video for playback to a viewer.

3. The method of claim 1, wherein the linear, non-interactive video comprises a teaser portion of at least some of the video segments from one of the paths of the video tree.

4. The method of claim 1, wherein the selected different path in the video tree is selected based on one or more attributes associated with a viewer of the linear, non-interactive video.

5. The method of claim 4, wherein the attributes comprise at least one of demographic attributes, geographic attributes, and social networking attributes.

6. The method of claim 1, wherein the selected different path in the video tree is randomly selected.

7. The method of claim 1, wherein traversing at least a portion of the first path comprises virtually playing back the at least a portion of the first path and recording the playback as part of the linear, non-interactive video.

8. The method of claim 7, further comprising recording a graphical user interface layer as part of the linear, non-interactive video.

9. The method of claim 1, wherein at least a portion of a video segment from the first path and at least a portion of a video segment from the selected different path are simultaneously presented in the linear, non-interactive video by disposing the first path video segment portion and the different path video segment portion in separate video frame regions.

10. The method of claim 1, further comprising:
   traversing at least a portion of each of a plurality of additional paths in the video tree; and
   adding to the linear, non-interactive video at least a portion of each of one or more video segments from the traversed portions of the additional paths in the video tree.

11. A system comprising:
   at least one memory for storing computer-executable instructions; and
   at least one processor for executing the instructions stored on the at least one memory, wherein execution of the instructions programs the at least one processor to perform operations comprising:
      receiving a plurality of video segments forming at least a portion of a traversable video tree, the video tree comprising a plurality of paths, each path comprising one or more of the video segments;
      automatically creating, at a first time, a linear, non-interactive video from the video segments by recording, on a server, a first virtual or emulated playthrough of the video tree, the creating of the linear, non-interactive video comprising:
         traversing, without manual user input, at least a portion of a first path in the video tree, the first path comprising a branching point at which the first path branches into a plurality of different paths in the video tree, wherein traversing at least the portion of the first path comprises selecting, without manual user input, which video segments in the first path to include, at least in part, in the linear, non-interactive video;
         adding to the linear, non-interactive video a graphical representation of simulated user interaction with a video segment from the traversed portion of the first path in the video tree, the simulated user interaction corresponding to a selection of one of the different paths in the video tree;
         traversing, without manual user input, at least a portion of the selected different path in the video tree, wherein traversing at least the portion of the selected different path comprises selecting, without manual user input, which video segments in the selected different path to include, at least in part, in the linear, non-interactive video; and
         combining (i) at least a portion of each of one or more video segments from the traversed portion of the first path in the video tree and (ii) at least a portion of each of one or more video segments from the traversed portion of the selected different path in the video tree, to form at least a portion of the linear, non-interactive video; and
      automatically creating, at a second, later time, another linear, non-interactive video from the video segments by recording, on a server, a second virtual or emulated playthrough of the video tree, the creating of the another linear, non-interactive video comprising traversing, without manual user input, at least a portion of one or more paths in the video tree and combining at least a portion of each of a subplurality of video segments in the plurality of video segments, wherein automatically creating the other linear, non-interactive video at the second time results in the other linear, non-interactive video containing video content different from video content in the linear, non-interactive video created at the first time.

12. The system of claim 11, wherein the operations further comprise providing the linear, non-interactive video for playback to a viewer.

13. The system of claim 11, wherein the linear, non-interactive video comprises a teaser portion of at least some of the video segments from one of the paths of the video tree.

14. The system of claim 11, wherein the selected different path in the video tree is selected based on one or more attributes associated with a viewer of the linear, non- interactive video.

15. The system of claim 14, wherein the attributes comprise at least one of demographic attributes, geographic attributes, and social networking attributes.

16. The system of claim 11, wherein the selected different path in the video tree is randomly selected.

17. The system of claim 11, wherein traversing at least a portion of the first path comprises virtually playing back the at least a portion of the first path and recording the playback as part of the linear, non-interactive video.

18. The system of claim 17, wherein the operations further comprise recording a graphical user interface layer as part of the linear, non-interactive video.

19. The system of claim 11, wherein at least a portion of a video segment from the first path and at least a portion of a video segment from the selected different path are simultaneously presented in the linear, non-interactive video by disposing the first path video segment portion and the different path video segment portion in separate video frame regions.

20. The system of claim 11, wherein the operations further comprise:
    traversing at least a portion of each of a plurality of additional paths in the video tree; and
    adding to the linear, non-interactive video at least a portion of each of one or more video segments from the traversed portions of the additional paths in the video tree.

* * * * *